US009633476B1

(12) United States Patent
Laaser et al.

(10) Patent No.: US 9,633,476 B1
(45) Date of Patent: Apr. 25, 2017

(54) METHOD AND APPARATUS FOR USING AUGMENTED REALITY FOR BUSINESS GRAPHICS

(75) Inventors: William T. Laaser, Palo Alto, CA (US); Gerald B. Huff, Berkeley, CA (US)

(73) Assignee: INTUIT INC., Mountain View, CA (US)

( * ) Notice: Subject to any disclaimer, the term of this patent is extended or adjusted under 35 U.S.C. 154(b) by 1711 days.

(21) Appl. No.: 12/608,053

(22) Filed: Oct. 29, 2009

(51) Int. Cl.
*G06T 19/00* (2011.01)

(52) U.S. Cl.
CPC .................................. *G06T 19/006* (2013.01)

(58) Field of Classification Search
CPC ...................................................... G06T 19/006
USPC ................................................. 345/632, 633
See application file for complete search history.

(56) References Cited

U.S. PATENT DOCUMENTS

| 5,999,944 | A | * | 12/1999 | Lipkin | |
|---|---|---|---|---|---|
| 6,771,277 | B2 | * | 8/2004 | Ohba | 345/629 |
| 6,771,294 | B1 | * | 8/2004 | Pulli et al. | 715/863 |
| 7,690,975 | B2 | * | 4/2010 | Watanabe et al. | 463/1 |
| 2002/0094189 | A1 | * | 7/2002 | Navab et al. | 386/4 |
| 2002/0140674 | A1 | * | 10/2002 | Okuno et al. | 345/158 |
| 2003/0012410 | A1 | * | 1/2003 | Navab et al. | 382/103 |
| 2008/0120561 | A1 | * | 5/2008 | Woods | 715/764 |
| 2008/0266323 | A1 | * | 10/2008 | Biocca et al. | 345/633 |
| 2009/0109240 | A1 | * | 4/2009 | Englert et al. | 345/633 |
| 2009/0208052 | A1 | * | 8/2009 | Kaplan | 382/103 |
| 2010/0048290 | A1 | * | 2/2010 | Baseley et al. | 463/25 |

OTHER PUBLICATIONS

Xiang Zhang, Nassir Navab, and Shih-Ping Liou, E-Commerce Direct Marketing using Augmented Reality, 2000, 2000 IEEE International Conference on Multimedia and Expo, ICME 2000, volumn 1, pp. 88-91.*
Tosiyasu L. Kunii, Cyber graphics, 2002, Proceedings of the First International Symposium on Cyber Worlds (CW'02), pp. 3-7.*
David E. Breen, Eric Rose, and Ross T. Whitaker, Interactive Occlusion and Collision of Real and Virtual Objects in Augmented Reality, 1995, European Computer-Industry Research Centre, pp. 1-18.*

* cited by examiner

*Primary Examiner* — Jeffery A Brier
(74) *Attorney, Agent, or Firm* — Patterson & Sheridan, LLP

(57) ABSTRACT

One embodiment provides a system for using Augmented Reality (AR) to facilitate displaying business graphics. The system receives at a computer system a video stream including an image of a marker, the marker being a physical object that is manipulated by the user and is recognizable by the computer system. The system recognizes the marker and receives from the user a selection of a business graphic. Next, the system renders the business graphic over the image of the marker in the video stream such that the image of the marker is obscured by the business graphic. The system then recognizes a manipulation of the marker indicated by a change in the image of the marker in the video stream. Next, the system performs an action on the business graphic that corresponds to the manipulation of the marker. Finally, the system displays the video stream to the user.

16 Claims, 6 Drawing Sheets
(3 of 6 Drawing Sheet(s) Filed in Color)

METHOD AND APPARATUS FOR USING AUGMENTED REALITY FOR BUSINESS GRAPHICS

BACKGROUND

Related Art

As software systems become increasingly more sophisticated, they are able to provide large amounts of data to a user in the form of charts, graphs, and reports. However, computer systems are often limited by their output devices (monitors, printers, etc.) with respect to how much information they can present to the user in one view. For example, with limited screen area, only a limited amount of information can be conveyed to the user at a given time. Furthermore, the more information that is presented to the user at a given time, the more cluttered the display becomes, which can make it hard for the user to interpret the data.

One way that users can quickly and intuitively visualize large amounts of data is by using three-dimensional graphics. A three-dimensional bar chart, for example, can hold many times more information than a two-dimensional bar chart. Furthermore, if the user is able to manipulate and rotate the three-dimensional bar chart, the user can position the three-dimensional bar chart in an orientation that allows the user to see data that might be obscured in a two-dimensional bar chart.

However, a number of problems must be addressed in order to efficiently implement three-dimensional graphics in a computing system. One of the biggest problems is associated with the user interface. Given only a keyboard and a mouse as the primary input devices, it can be exceedingly difficult and unnatural for the user to manipulate a three-dimensional object.

SUMMARY

One embodiment of the present invention provides a system for using Augmented Reality (AR) to facilitate displaying business graphics. During operation, the system receives at a computer system a video stream, wherein the video stream includes an image of a marker, and wherein the marker is a physical object that is manipulated by the user and is recognizable by the computer system. Next, the system recognizes the marker. The system then receives from the user a selection of a business graphic. Next, the system renders the business graphic over the image of the marker in the video stream such that the image of the marker is obscured by the business graphic. The system then recognizes a manipulation of the marker, wherein the manipulation of the marker is indicated by a change in the image of the marker in the video stream. Next, the system performs an action on the business graphic that corresponds to the manipulation of the marker, wherein the action is displayed in the video stream. Finally, the system displays the video stream to the user.

In some embodiments of the present invention, the system recognizes the marker by determining a location of the image of the marker in the video stream. Finally, the system determines an orientation of the marker in the video stream.

In some embodiments of the present invention, the marker is used to identify a fixed location and a fixed orientation in space. Once identified, movement of the marker is ignored and the business graphic is rendered in the fixed location and in the fixed orientation.

In some embodiments of the present invention, the system receives a command from the user to perform a virtual manipulation on the business graphic at the computer system, wherein the command is generated when the user simulates manipulating the business graphic as if the business graphic were a physical object. Finally, the system performs a second action on the business graphic that corresponds to the virtual manipulation, wherein the second action is displayed in the video stream.

In some embodiments of the present invention, rendering the business graphic over the image of the marker involves rendering the business graphic so that it has the same location and the same orientation as the image of the marker in the video stream.

In some embodiments of the present invention, recognizing the marker involves recognizing a depth of the image of the marker in the video stream.

In some embodiments of the present invention, recognizing the marker involves recognizing a visually unique pattern on the marker.

In some embodiments of the present invention, recognizing the marker involves recognizing the marker while the marker is partially obscured.

In some embodiments of the present invention, the system receives an input from the user at the computer system via an input device, wherein the input is directed to a portion of the business graphic in the video stream. Finally, in response to the input, the system performs an action on the portion of the business graphic.

In some embodiments of the present invention, the system recognizes a second marker at the computer system. Next, the system recognizes a manipulation of the second marker at the computer system. Finally, the system performs a second action on the business graphic that corresponds to the manipulation of the second marker, wherein the second action is displayed in the video stream.

In some embodiments of the present invention, a camera that is capturing the video stream is mounted in a fixed location, and the marker is free to move. In other embodiments, the marker is fixed to a physical location and the camera is free to move. Still, in other embodiments, both the camera and the marker are moveable.

In some embodiments of the present invention, rendering the business graphic over the image of the marker in the video stream involves animating the business graphic to include a movement, wherein the movement is not related to a change in an orientation or a location of the marker or a camera providing the video stream.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
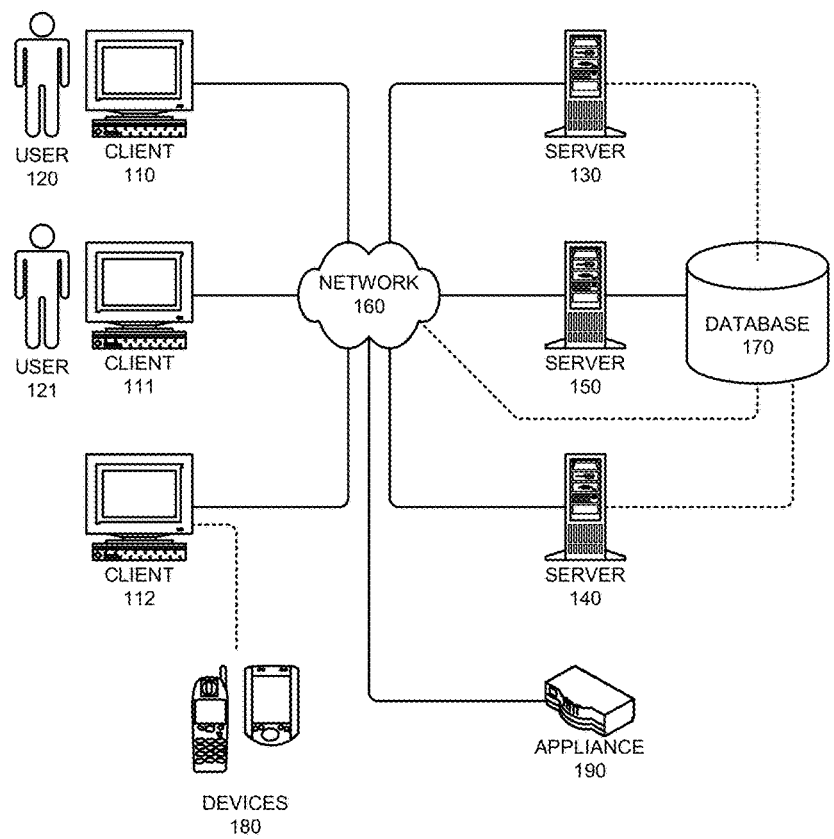
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

OVERVIEW

One embodiment of the present invention provides a system for using Augmented Reality (AR) for business graphics. During operation, the system receives at a computer system a video stream, wherein the video stream includes an image of a marker, and wherein the marker is a physical object that is manipulated by the user and is recognizable by the computer system. For example, an increasing number of monitors and laptops feature built-in webcams. These webcams are suitable for providing the video stream used by embodiments of the present invention.

Next, the system recognizes the marker in the video stream. The system then receives from a user of the computer system a selection of a business graphic. After that, the system renders the business graphic over the image of the marker in the video stream such that the image of the marker is obscured by the business graphic. Note that the marker is purely used as an anchor for the business graphic. Wherever the anchor is in the video stream is where the business graphic is rendered into the video stream.

The system then recognizes a manipulation of the marker in the video stream, wherein the manipulation of the marker is indicated by a change in the image of the marker in the video stream. Note that a manipulation of the marker can include simply moving the marker, as well as slightly more complex manipulations, such as rotating the marker or shaking the marker.

Next, the system performs an action on the business graphic that corresponds to the manipulation of the marker, wherein the action is displayed in the video stream. Finally, the system displays the video stream to the user.

For instance, consider a situation where a user is sitting in front of a computer system with a webcam pointing toward the user. Furthermore, assume that the user is interacting with financial software that uses embodiments of the present invention. In this situation, the user can see herself, and a marker that she is holding, in real-time in a video stream originating from her webcam.

Upon receiving a selection of a business graphic, such as a multi-year sales breakdown by product category, the system renders the business graphic over the top of the marker in the video stream. To the user, it appears as if she is holding a three-dimensional object in her hand instead of holding the marker. If the user wants to see a portion of the business graphic in more detail, she can simply rotate the marker so that the portion that she wants to see is at the front of the business graphic from her viewpoint. Moreover, she can move the marker closer to the camera so that the business graphic takes up more space in the video stream.

In some embodiments of the present invention, the system recognizes the marker by determining a location of the image of the marker in the video stream. Finally, the system determines an orientation of the marker in the video stream. Note that the orientation of the marker is important because the system needs to determine if the marker is being rotated, and on which axis the marker is being rotated, in order to render the same movements with the business graphic.

Furthermore, note that in some embodiments of the present invention, the marker can have an absolute orientation, wherein the marker itself has a top, a bottom, and sides, while in other embodiments the marker has a virtual orientation, and the orientation is fixed upon initializing the system.

For example, a marker can include a wooden block that has a top, a bottom, and multiple sides. One specific side of the wooden block is always the top. Alternatively, a marker can also include a rubber duck, wherein whichever portion of the rubber duck is on top when the system is initialized becomes the top of the marker for the remainder of the current session. Note that any physical object that can be identified by the system, and for which the system can determine its orientation, can be used as a marker.

In some embodiments of the present invention, the marker is used to identify a fixed location and a fixed orientation in space. Once identified, movement of the marker is ignored and the business graphic is rendered in the fixed location and in the fixed orientation.

In these embodiments, the business graphic becomes fixed to a current point in the video stream. This allows the user to have both of her hands free to perform other tasks, such as manipulating a keyboard and a mouse.

In some embodiments of the present invention, the system receives a command from the user to perform a virtual manipulation on the business graphic at the computer system, wherein the command is generated when the user simulates manipulating the business graphic as if the business graphic were a physical object. Finally, the system performs a second action on the business graphic that corresponds to the virtual manipulation, wherein the second action is displayed in the video stream.

For example, in the situation where the business graphic is in a fixed location and the marker is removed from the video stream, the user can no longer manipulate the marker to control the business graphic. In this embodiment, the user may simply manipulate the business graphic as if it were a real physical object. For instance, the user may place her hand below the business graphic in the video stream and rotate her hand as if she were rotating the business graphic. In response to this motion by the user, the system then rotates the business graphic.

In some embodiments of the present invention, rendering the business graphic over the image of the marker involves rendering the business graphic so that it has the same location and the same orientation as the image of the marker in the video stream. Note that as described previously the system maintains the orientation and the location of the business graphic to coincide with the orientation and the location of the marker within the video stream.

In some embodiments of the present invention, recognizing the marker involves recognizing a depth of the image of the marker in the video stream.

In some embodiments of the present invention, recognizing the marker involves recognizing a visually unique pattern on the marker. For example, the marker may have a dot pattern printed on the marker that not only identifies the marker, but also identifies the orientation of the marker.

In some embodiments of the present invention, recognizing the marker involves recognizing the marker while it is partially obscured. Note that while in some embodiments the system relies on a clear and complete view of the marker at all times, in other embodiments the marker may become partially obscured and the system will continue to render the business graphic to the marker.

In some embodiments if a portion of the marker becomes obscured, the system illustrates the business graphic so that the business graphic obscures the object that obscured the marker. In contrast, in other embodiments the system partially obscures the business graphic to coincide with the partially obscured business marker.

In some embodiments of the present invention, the system receives an input from the user at the computer system via an input device, wherein the input is directed to a portion of the business graphic in the video stream. In response to this input, the system performs an action on the portion of the business graphic.

For example, the user may move a mouse cursor over the business graphic with her right hand, while still controlling the marker with her left hand.

In this example, the user could click on sections of the business graphic to "drill down" in a particular category or account. The ability to manipulate the business graphic with one hand while performing actions on it with another input mechanism opens up a new set of user interface opportunities.

In some embodiments of the present invention, the system recognizes a second marker at the computer system. Next, the system receives a manipulation of the second marker at the computer system. Finally, the system performs a second action on the business graphic that corresponds to the manipulation of the second marker, wherein the second action is displayed in the video stream.

By introducing multiple markers in the video stream, the user can direct interactions between different data sets, accounts, entities, etc. that are associated with the different markers.

In some embodiments of the present invention, a camera that is capturing the video stream is mounted in a fixed location, and the marker is free to move. For example, in one embodiment the camera is built into the computer monitor of the user. The camera is fixed, and always faces the user. In this example, the user is free to move the marker in and out of range of the fixed camera.

In other embodiments, the marker is fixed to a physical location and the camera is free to move. For example, in one embodiment the video stream is captured by a camera integrated in the user's cell phone. The user then looks at the screen on the cell phone and moves the phone around a fixed marker to view different portions of a business graphic that is rendered over the fixed marker. For example, the fixed marker can be a physical model of a construction project, and the business graphic can include project status information for the construction project. The user then interacts with the business graphic by moving his or her cell phone around the physical construction model.

Still, in other embodiments, both the camera and the marker are moveable. Embodiments of the present invention work equally well if the camera, the marker, or both are moveable.

In some embodiments of the present invention, rendering the business graphic over the image of the marker in the video stream involves animating the business graphic to include a movement, wherein the movement is not related to a change in an orientation or a location of the marker or a camera providing the video stream.

For example, the system may animate a pie chart displaying sales by department to illustrate changes in sales trends over time. This animation is dependent purely on the data illustrated by the business graphic, and is independent of motion to the business graphic caused by manipulations of the marker or the camera providing the video stream.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
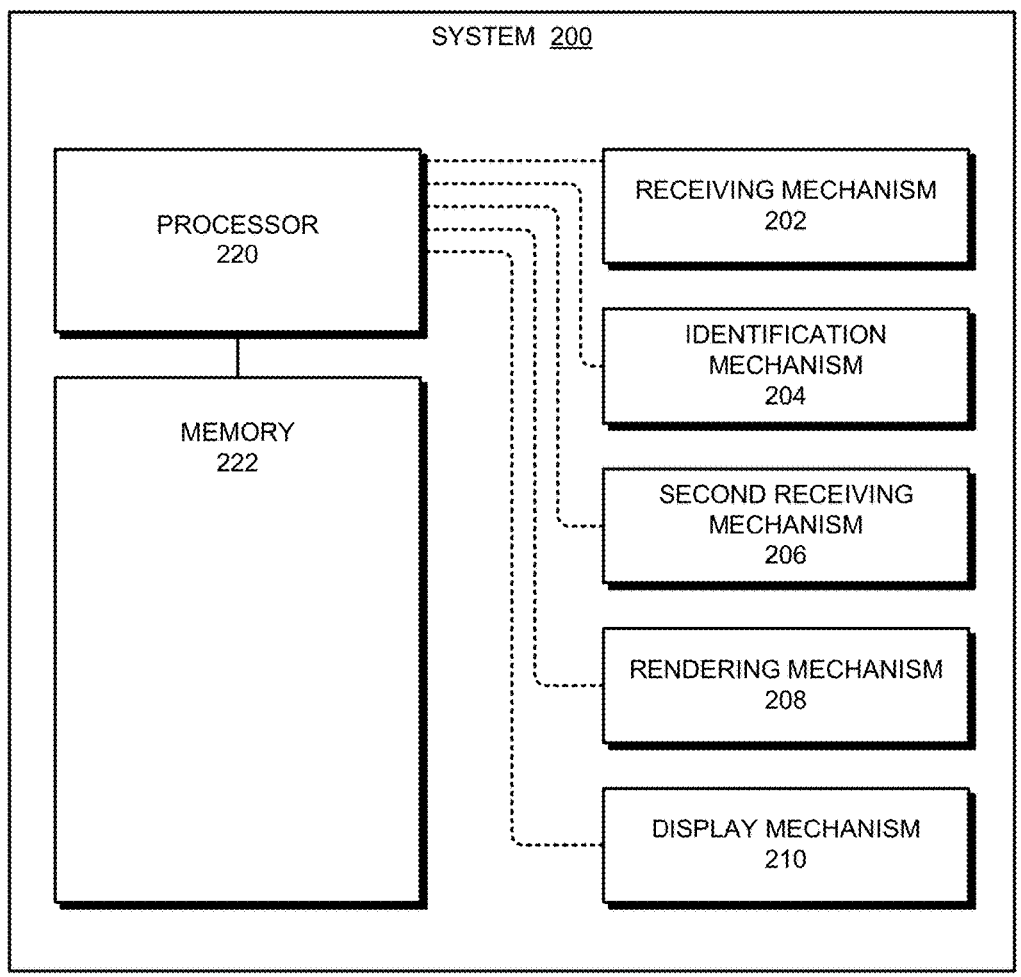
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, identification mechanism 204, second receiving mechanism 206, rendering mechanism 208, display mechanism 210, processor 220, and memory 222.

Note that receiving mechanism 202 can comprise a web camera or any other type of video input device capable of creating a digitized video stream.

Providing an Augmented Reality (AR) with Business Graphics

Figure 3:
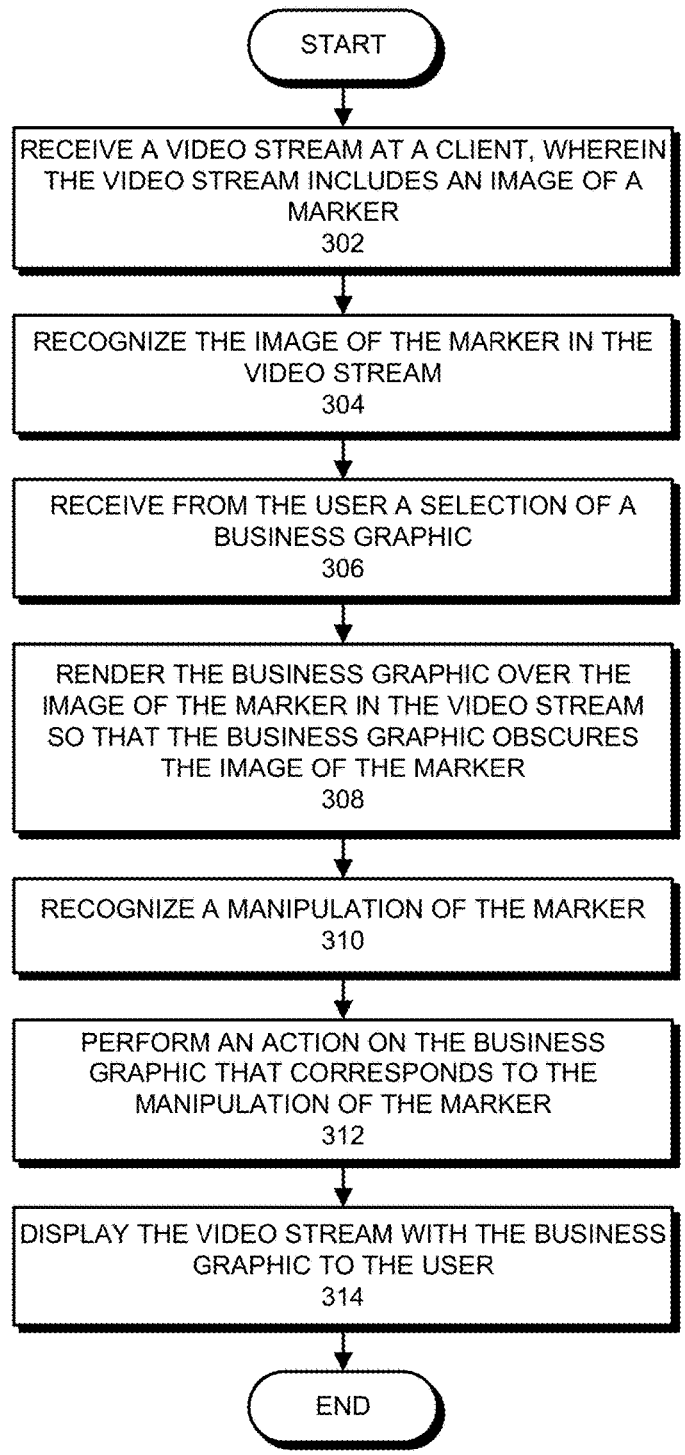
FIG. 3 presents a flow chart illustrating the process of providing an Augmented Reality with business graphics in accordance with an embodiment of the present invention.

FIG. 3 presents a flow chart illustrating the process of providing an Augmented Reality with business graphics in accordance with an embodiment of the present invention.

During operation, receiving mechanism 202 receives at client 110 a video stream (operation 302), wherein the video stream includes an image of a marker, and wherein the marker is a physical object which is manipulated by user 120 and is recognizable by client 110. Next, identification mechanism 204 recognizes the image of the marker in the video stream (operation 304). Second, receiving mechanism 206 receives from user 120 a selection of a business graphic (operation 306).

Next, rendering mechanism 208 renders the business graphic over the image of the marker in the video stream such that the image of the marker is obscured by the business graphic (operation 308). Next, second receiving mechanism 206 recognizes a manipulation of the marker (operation 310), wherein the manipulation of the marker is indicated by a change in the image of the marker in the video stream. Next, rendering mechanism 208 performs an action on the business graphic that corresponds to the manipulation of the marker (operation 312), wherein the action is displayed in the video stream. Finally, display mechanism 210 displays the video stream to user 120 (operation 314).

Screenshots

Figure 4A:
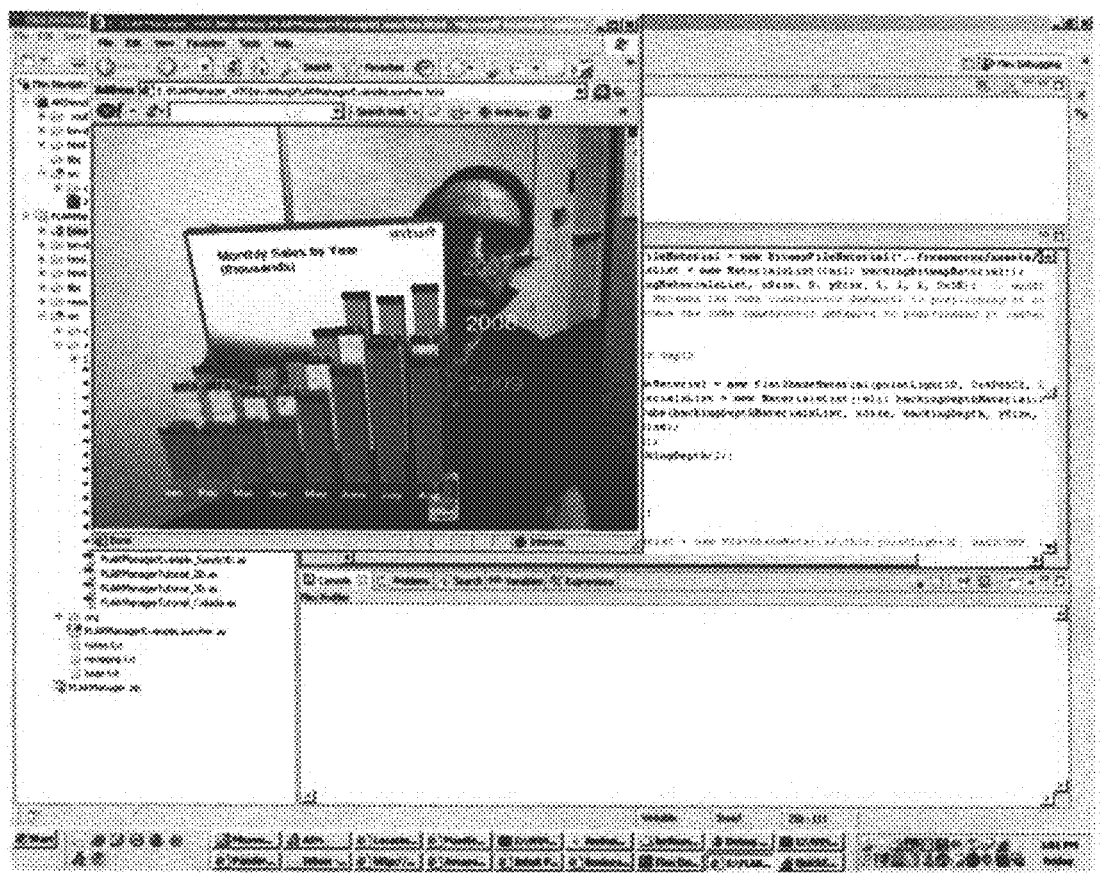
FIGS. 4A-4C present screenshots of an Augmented Reality with business graphics in accordance with an embodiment of the present invention.
Figure 4B:
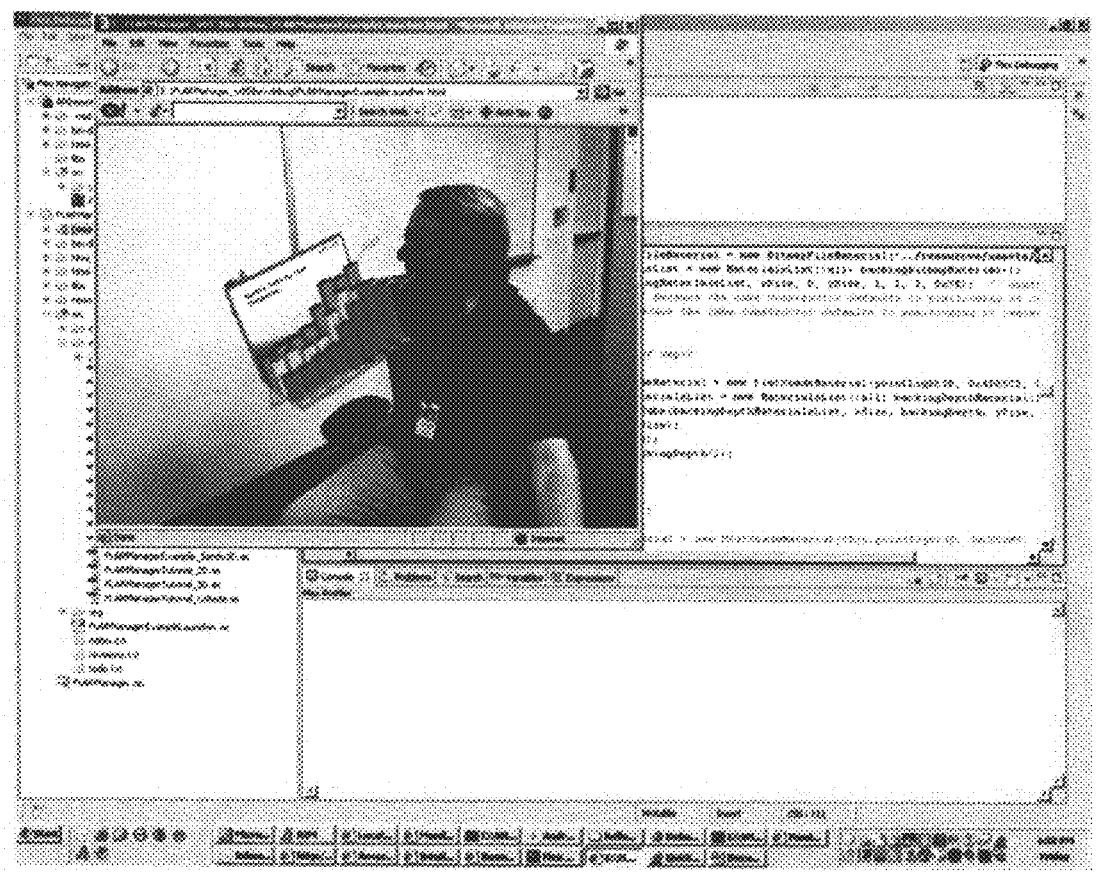
Figure 4C:
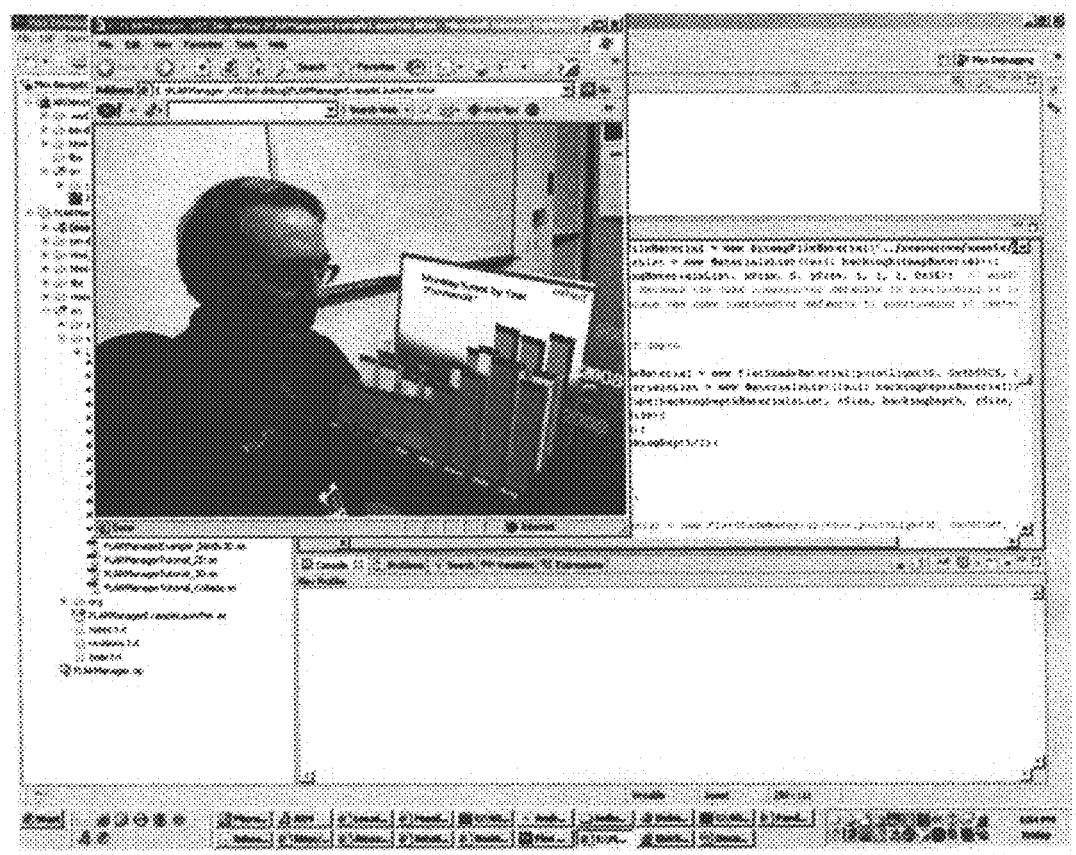

FIGS. 4A-4C present screenshots of an Augmented Reality with business graphics in accordance with an embodiment of the present invention. As illustrated in FIGS. 4A-4C, a user is holding a marker that is obscured by a three-dimensional bar chart illustrating monthly sales by year for 2007, 2008, and 2009. Note that as described previously as the user moves the marker around in the video stream, the system renders the business graphic to have the same location and orientation as the marker.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for using Augmented Reality (AR) for business graphics, the method comprising:
    receiving at a computer system a video stream, wherein the video stream includes an image of a marker, and wherein the marker is a physical object that is manipulated by a user and is recognizable by the computer system;
    recognizing the marker at the computer system;
    receiving from the user a selection of a business graphic, wherein a business graphic is a visual representation of business data;
    rendering the business graphic over the image of the marker in the video stream such that the image of the marker is obscured by the business graphic;
    recognizing a physical manipulation of the marker at the computer system, wherein the physical manipulation of the marker is indicated by a change in the image of the marker in the video stream;
    performing an action on the business graphic that corresponds to the physical manipulation of the marker, wherein the action is displayed in the video stream;
    in response to receiving a command from the user to disregard physical manipulations of the marker, fixing the business graphic to the last known location of the image of the marker in the video stream, thereby allowing the user to physically manipulate the marker without affecting the business graphic;
    after fixing the business graphic to the last known location of the image of the marker in the video stream, recognizing a virtual manipulation on the business graphic at the computer system, wherein the virtual manipulation is indicated when the user moves one of the user's hands to simulate a rotation of the business graphic;
    performing a second action on the business graphic that corresponds to the virtual manipulation, wherein the second action corresponds to rotating the business graphic and the second action is displayed in the video stream; and
    displaying the video stream to the user.

2. The computer-implemented method of claim 1, wherein recognizing the marker involves:
    determining a location of the image of the marker in the video stream; and determining an orientation of the marker in the video stream.

3. The computer-implemented method of claim 1, wherein rendering the business graphic over the image of the marker involves rendering the business graphic so that the business graphic has the same location and the same orientation as the image of the marker in the video stream.

4. The computer-implemented method of claim 1, wherein recognizing the marker involves recognizing a depth of the image of the marker in the video stream.

5. The computer-implemented method of claim 1, wherein recognizing the marker involves recognizing a visually unique pattern on the marker.

6. The computer-implemented method of claim 1, wherein recognizing the marker involves recognizing the marker while it is partially obscured.

7. The computer-implemented method of claim 1, further comprising:
   recognizing a second marker at the computer system;
   recognizing a manipulation of the second marker at the computer system; and
   performing a second action on the business graphic that corresponds to the manipulation of the second marker, wherein the second action is displayed in the video stream.

8. The computer-implemented method of claim 1, wherein rendering the business graphic over the image of the marker in the video stream involves animating the business graphic to include a movement, wherein the movement is not related to a change in an orientation or a location of the marker or a camera providing the video stream.

9. A non-transitory computer-readable storage medium storing instructions that when executed by a computer cause the computer to perform a method for using Augmented Reality (AR) for business graphics, the method comprising:
   receiving at a computer system a video stream, wherein the video stream includes an image of a marker, and wherein the marker is a physical object that is manipulated by a user and is recognizable by the computer system;
   recognizing the marker at the computer system;
   receiving from the user of the computer system a selection of a business graphic, wherein a business graphic is a visual representation of business data;
   rendering the business graphic over the image of the marker in the video stream such that the image of the marker is obscured by the business graphic;
   recognizing a physical manipulation of the marker at the computer system, wherein the physical manipulation of the marker is indicated by a change in the image of the marker in the video stream;
   performing an action on the business graphic that corresponds to the physical manipulation of the marker, wherein the action is displayed in the video stream;
   in response to receiving a command from the user to disregard physical manipulations of the marker, fixing the business graphic to the last known location of the image of the marker in the video stream, thereby allowing the user to physically manipulate the marker without affecting the business graphic;
   after fixing the business graphic to the last known location of the image of the marker in the video stream, recognizing a virtual manipulation on the business graphic at the computer system, wherein the virtual manipulation is indicated when the user moves one of the user's hands to simulate a rotation of the business graphic;
   performing a second action on the business graphic that corresponds to the virtual manipulation, wherein the second action corresponds to rotating the business graphic and the second action is displayed in the video stream; and
   displaying the video stream to the user.

10. The non-transitory computer-readable storage medium of claim 9, wherein recognizing the marker involves:
    determining a location of the image of the marker in the video stream; and
    determining an orientation of the marker in the video stream.

11. The non-transitory computer-readable storage medium of claim 9, wherein rendering the business graphic over the image of the marker involves rendering the business graphic so that it has the same location and the same orientation as the image of the marker in the video stream.

12. The non-transitory computer-readable storage medium of claim 9, wherein recognizing the marker involves recognizing a depth of the image of the marker in the video stream.

13. The non-transitory computer-readable storage medium of claim 9, wherein recognizing the marker involves recognizing a visually unique pattern on the marker.

14. The non-transitory computer-readable storage medium of claim 9, wherein recognizing the marker involves recognizing the marker while it is partially obscured.

15. The non-transitory computer-readable storage medium of claim 9, wherein the method further comprises:
    recognizing a second marker at the computer system;
    recognizing a manipulation of the second marker at the computer system; and
    performing a second action on the business graphic that corresponds to the manipulation of the second marker, wherein the second action is displayed in the video stream.

16. The non-transitory computer-readable storage medium of claim 9, wherein rendering the business graphic over the image of the marker in the video stream involves animating the business graphic to include a movement, wherein the movement is not related to a change in an orientation or a location of the marker or a camera providing the video stream.

* * * * *